US008312426B2

(12) United States Patent
Bouillet et al.

(10) Patent No.: US 8,312,426 B2
(45) Date of Patent: Nov. 13, 2012

(54) METHOD AND SYSTEM FOR SIMPLIFIED SERVICE COMPOSITION IN WEB ENVIRONMENT

(75) Inventors: Eric Bouillet, Englewood, NJ (US); Zhen Liu, Tarrytown, NY (US); Anton V. Riabov, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 11/970,262

(22) Filed: Jan. 7, 2008

(65) Prior Publication Data

US 2009/0177957 A1 Jul. 9, 2009

(51) Int. Cl.
G06F 9/44 (2006.01)
G06F 9/45 (2006.01)

(52) U.S. Cl. .................... 717/109; 717/144; 717/156

(58) Field of Classification Search .......... 717/109–115, 717/143–144, 156–157; 707/713–715, 718
See application file for complete search history.

(56) References Cited

U.S. PATENT DOCUMENTS

| | | | |
|---|---|---|---|
| 4,571,678 A * | 2/1986 | Chaitin ................... | 717/156 |
| 5,187,788 A * | 2/1993 | Marmelstein ............. | 717/109 |
| 5,659,754 A * | 8/1997 | Grove et al. .............. | 717/158 |
| 5,675,757 A | 10/1997 | Davidson et al. | |
| 5,675,805 A * | 10/1997 | Boldo et al. .............. | 717/114 |
| 5,696,693 A | 12/1997 | Aubel et al. | |
| 5,937,195 A * | 8/1999 | Ju et al. .................... | 717/156 |
| 5,999,729 A | 12/1999 | Tabloski, Jr. et al. | |
| 6,032,142 A | 2/2000 | Wavish | |
| 6,053,951 A * | 4/2000 | McDonald et al. ........ | 717/109 |
| 6,347,320 B1 | 2/2002 | Christensen et al. | |
| 6,430,698 B1 | 8/2002 | Khalil et al. | |
| 6,601,112 B1 | 7/2003 | O'Rourke et al. | |
| 6,665,863 B1 * | 12/2003 | Lord et al. ................ | 717/144 |
| 6,721,747 B2 * | 4/2004 | Lipkin ...................... | 709/209 |
| 6,792,595 B1 * | 9/2004 | Storistenau et al. ...... | 717/110 |
| 6,799,184 B2 * | 9/2004 | Bhatt et al. ............... | 707/718 |
| 6,813,587 B2 | 11/2004 | McIntyre et al. | |
| 6,891,471 B2 | 5/2005 | Yuen et al. | |
| 6,983,446 B2 * | 1/2006 | Charisius et al. ......... | 717/113 |
| 7,062,762 B2 * | 6/2006 | Krishnamurthy et al. .. | 717/156 |
| 7,103,873 B2 * | 9/2006 | Tanner et al. ............. | 717/109 |
| 7,164,422 B1 | 1/2007 | Wholey, III et al. | |
| 7,174,536 B1 * | 2/2007 | Kothari et al. ............ | 717/109 |
| 7,231,632 B2 * | 6/2007 | Harper ...................... | 717/109 |
| 7,263,694 B2 * | 8/2007 | Clewis et al. ............. | 717/156 |
| 7,290,244 B2 * | 10/2007 | Peck et al. ................ | 717/109 |
| 7,334,216 B2 * | 2/2008 | Molina-Moreno et al. .. | 717/109 |
| 7,409,676 B2 | 8/2008 | Agarwal et al. | |
| 7,426,721 B1 * | 9/2008 | Saulpaugh et al. ....... | 717/144 |

(Continued)

OTHER PUBLICATIONS

Connor et al, "Key key value stores for efficiently processing graph data in the cloud", IEEE, pp. 88-93, 2011.*

(Continued)

*Primary Examiner* — Anil Khatri
(74) *Attorney, Agent, or Firm* — F. Chau & Associates, LLC

(57) ABSTRACT

A method for service composition whereby a tag query is received and a processing graph is composed in accordance with the tag query. The processing graph is composed by using annotated primal data and services. The processing graph includes at least one of the services. The service included in the processing graph is deployed in an execution environment.

17 Claims, 9 Drawing Sheets

U.S. PATENT DOCUMENTS

| | | | |
|---|---|---|---|
| 7,466,810 B1 | 12/2008 | Quon et al. | |
| 7,472,379 B2* | 12/2008 | Chessell et al. | 717/132 |
| 7,499,906 B2* | 3/2009 | Kloppmann et al. | 707/713 |
| 7,536,676 B2* | 5/2009 | Baker et al. | 717/113 |
| 7,543,284 B2* | 6/2009 | Bolton et al. | 717/157 |
| 7,565,640 B2* | 7/2009 | Shukla et al. | 717/105 |
| 7,614,041 B2* | 11/2009 | Harper | 717/120 |
| 7,627,808 B2 | 12/2009 | Blank et al. | |
| 7,639,726 B1 | 12/2009 | Sinsuan et al. | |
| 7,657,436 B2* | 2/2010 | Elmore et al. | 705/1.1 |
| 7,681,177 B2* | 3/2010 | LeTourneau | 717/112 |
| 7,685,566 B2* | 3/2010 | Brown et al. | 717/114 |
| 7,716,167 B2* | 5/2010 | Colossi et al. | 707/714 |
| 7,716,199 B2* | 5/2010 | Guha | 707/706 |
| 7,730,467 B1* | 6/2010 | Hejlsberg et al. | 717/143 |
| 7,756,855 B2* | 7/2010 | Ismalon | 707/713 |
| 7,769,747 B2* | 8/2010 | Berg et al. | 707/716 |
| 7,773,877 B2 | 8/2010 | Yang et al. | |
| 7,792,836 B2* | 9/2010 | Taswell | 707/737 |
| 7,797,303 B2* | 9/2010 | Roulland et al. | 707/713 |
| 7,809,801 B1* | 10/2010 | Wang et al. | 709/217 |
| 7,810,085 B2* | 10/2010 | Shinnar et al. | 717/156 |
| 7,814,123 B2 | 10/2010 | Nguyen et al. | |
| 7,827,210 B2* | 11/2010 | Meliksetian et al. | 707/803 |
| 7,860,863 B2* | 12/2010 | Bar-Or et al. | 707/736 |
| 7,861,151 B2 | 12/2010 | Milic-Frayling et al. | |
| 7,877,387 B2* | 1/2011 | Hangartner | 707/736 |
| 7,882,485 B2 | 2/2011 | Feblowitz et al. | |
| 7,886,269 B2* | 2/2011 | Williams et al. | 717/121 |
| 7,886,273 B2 | 2/2011 | Hinchey et al. | |
| 7,900,201 B1 | 3/2011 | Qureshi et al. | |
| 7,954,090 B1 | 5/2011 | Qureshi et al. | |
| 7,958,148 B2 | 6/2011 | Barnes et al. | |
| 7,982,609 B2 | 7/2011 | Padmanabhan et al. | |
| 7,984,417 B2* | 7/2011 | Ben-Zvi et al. | 717/106 |
| 7,984,423 B2* | 7/2011 | Kodosky et al. | 717/113 |
| 7,992,134 B2 | 8/2011 | Hinchey et al. | |
| 8,001,527 B1 | 8/2011 | Qureshi et al. | |
| 8,032,522 B2* | 10/2011 | Goldstein et al. | 707/718 |
| 8,037,036 B2 | 10/2011 | Blumenau et al. | |
| 8,046,737 B2* | 10/2011 | Wittenberg et al. | 717/109 |
| 8,078,487 B2 | 12/2011 | Li et al. | |
| 8,078,953 B2 | 12/2011 | Kunz et al. | |
| 8,086,598 B1* | 12/2011 | Lamb et al. | 707/714 |
| 8,122,006 B2* | 2/2012 | de Castro Alves et al. | 707/713 |
| 2002/0109706 A1 | 8/2002 | Lincke et al. | |
| 2004/0015783 A1 | 1/2004 | Lennon et al. | |
| 2004/0249664 A1 | 12/2004 | Broverman et al. | |
| 2005/0096960 A1 | 5/2005 | Plutowski et al. | |
| 2005/0125738 A1 | 6/2005 | Srivastava et al. | |
| 2005/0125739 A1 | 6/2005 | Thompson et al. | |
| 2005/0159994 A1 | 7/2005 | Huddleston et al. | |
| 2005/0172306 A1 | 8/2005 | Agarwal et al. | |
| 2005/0177406 A1 | 8/2005 | Facciorusso et al. | |
| 2005/0192870 A1 | 9/2005 | Geddes | |
| 2006/0212836 A1 | 9/2006 | Khushraj et al. | |
| 2007/0033590 A1 | 2/2007 | Masuouka et al. | |
| 2007/0043607 A1 | 2/2007 | Howard et al. | |
| 2007/0112777 A1 | 5/2007 | Field et al. | |
| 2007/0136281 A1 | 6/2007 | Li et al. | |
| 2007/0190499 A1 | 8/2007 | Baur | |
| 2007/0204020 A1 | 8/2007 | Anderson et al. | |
| 2007/0208685 A1 | 9/2007 | Blumenau | |
| 2007/0244912 A1 | 10/2007 | Kawaguchi | |
| 2007/0245298 A1 | 10/2007 | Grabarnik et al. | |
| 2007/0250331 A1 | 10/2007 | Liu et al. | |
| 2008/0065455 A1 | 3/2008 | Sun et al. | |
| 2008/0086485 A1 | 4/2008 | Paper | |
| 2008/0140778 A1 | 6/2008 | Banavar et al. | |
| 2008/0168529 A1 | 7/2008 | Anderson et al. | |
| 2008/0243484 A1 | 10/2008 | Mohri et al. | |
| 2009/0070165 A1 | 3/2009 | Baeuerle et al. | |
| 2009/0100407 A1 | 4/2009 | Bouillet et al. | |
| 2009/0125366 A1 | 5/2009 | Chakraborty et al. | |
| 2009/0177957 A1 | 7/2009 | Bouillet et al. | |
| 2009/0192783 A1 | 7/2009 | Jurach, Jr. et al. | |
| 2009/0249370 A1 | 10/2009 | Liu et al. | |
| 2009/0265718 A1 | 10/2009 | Liu et al. | |
| 2010/0293043 A1 | 11/2010 | Atreya et al. | |
| 2011/0078285 A1 | 3/2011 | Hawkins et al. | |

OTHER PUBLICATIONS

Ma et al, "Mining web graphs for recommendations", IEEE, pp. 1-14, 2011.*

Jiang et al, "XML RL update language: syntax and semantics", IEEE, pp. 810-816, 2010.*

Comito et al, "Selectively based XML query processing in structured peer to peer networks", ACM IDEAS, pp. 236-244, 2010.*

Bohannon et al, "Optimizing view queries to ROLEX to support navigable results trees", ACM, pp. 1-12, 2002.*

Lyritsis et al, "TAGs; Scalable threshold based algotithms for proximity computation in graphs", ACM EDBT, pp. 295-306, 2011.*

Sheshagiri et al., "A Planner for Composing Services Described in DAML-S", ACM 2003, pp. 1-5.

Akkiraju et al., "SEMAPLAN: Combining Planning with Semantic Matching to Achieve Web Service Composition", American Association for Artificial Intelligence 2005, pp. 1-8.

D.. Hinchcliffe, "A bumper crop of new mashup platforms", http://blogs.zdnet.com/Hinchcliffe/?p=111&tag=nl.e622. Jul. 23, 2007.

Navendu Jain, Lisa Amini, Henrique Andrade, Richard King, Yoonho Park, Philippe Selo and Chitra Venkatramani, "Designed, Implementation, and Evaluation of the Linear Road benchmark on the Stream Processing Core", Proceedings of ACM SIGMOND 2006.

Zhen Liu, Anand Ranganathan and Anton Riabov, "A Planning Approach for Message-Oriented Semantic Web Service Composition", in AAAI-2007.

Marti Hearst, Design Recommendations for Hierarchical Faceted Search Interfaces, ACM SIGIR Workshop on Faceted Search, Aug. 2006.

A. Riabov, Z. Liu Planning for Stream Processing Systems. In Proceedings of AAAI-05.

Riabov et al., Wishful Search: Interactive Composition of Data Mashups, Google 2008, pp. 775-784.

Habernal et al., Active Tags for Semantic Analysis, Google 2008, pp. 69-76.

A. Riabov and Z. Liu Scalable Planning for Distributed Stream Processing Systems. In ICAPS '06, 2006.

E. Sirin and B. Parsia. Planning for Semantic Web Services. In Semantic Web Services Workshop at 3rd ISWC, 2004.

K. Whitehouse, F. Zhao and J. Liu. Semantic Streams: a Framework for Composable Semantic Interpretation of Sensor Data. In EWSN '06, 2006.

M. Pistore, P. Traverso, P. Bertoli and A. Marconi. Automated Synthesis of Composite BPEL4WS Web Services. In ICWS, 2005.

Baird, R.; Hepner, M.; Jorgenson, N.; Gamble, R., "Automating Preference and Change in Workflows," Seventh International Conference on Composition-Based Software Systems (Feb. 25-29, 2008), pp. 184-193 [retrieved http://ieeexplore.ieee.org/stamp/stamp.jsp?tp=&arnumber=4464023&isnumber=4463987].

Pistore, M.; Barbon, F.; Bertoli, P.; Shaparau, D.; Traverso, P., "Planning and Monitoring Web Service Composition" (2004), AIMSA 2004, LNAI 3192, pp. 106-115 [retrieved from http://www.springerlink.com/content/21nucbh4rrjfk8av/fulltext.pdf].

Peer, J., "Web Service Composition As AI Planning—A Survey", (2005) [retrieved from http://decsai.ugr.es/~faro/CDoctorado/bibliografia/refPlanning4SW/LinkedDocuments/webservice-composition-as-aiplanning-pfwsc.pdf].

Hepner, M., "Dynamic Changes to Workflow instances of Web Services," (2007), University of Tulsa, [retrieved from http://www.seat.utulsa.edu/papers/Hepner07-Dissertation.pdf].

A. Stentz, The Focused D Algorithm for Real-Time Replanning (IJCAI-1995).

Heinlein, C. "Workflow and Process Synchronization with Interaction Expressions and Graphs", 2001, IEEE, pp. 243-252.

Xie et al., "An additive reliability model for the analysis of modular software failure data", Oct. 24, 1995, IEEE, pp. 188-193.

Groen et al., "Reliability data collection and analysis system", Aug. 24, 2004, IEEE, pp. 43-48.

Camilo Rostoker, Alan Wagner, Holger Hoos, "A Parallel Workflow for Real-time Correlation and Clustering of High-Frequency Stock Market Data", (Mar. 26-30, 2007), Parallel and Distributed Processing Symposium, 2007, IPDPS 2007. IEEE International pp. 1-10 [retrieved from http://ieeexplore.ieee.org/stamp/stamp.jsp?tp=&arnumber=4227918].

Rana et al., An XML Based Component Model for Generating Scientific Applications and Performing Large Scale Simulations in a Meta-computing Environment, Google 2000, pp. 210-224.

Santos-Neto et al., Tracking Usage in Collaborative Tagging Communities, Google 2007, pp. 1-8.

Li et al. Collaborative Tagging Applications and Approaches, IEEE Sep. 2008, pp. 1-8 (14-21).

* cited by examiner

FIG. 2

○ Mario.Zero - IBM Research - Flow related to MinShippingCost - Mozilla Firefox   — □ ×

File  Edit  View  History  Bookmarks  Tools  Help

EUR  JPY  Price ← Tag cloud

MinShippingCost [    ] Go

MinShippingCost | DHL Fedex UPS USD ← Selected tags / Guessed and implied tags

Zero Assemble Flow | Edit Flow | View Source | Service URL | View Zero State ← Dispositions This flow has input parameters, and is outputting:
- Minimum cost of:
  ○ Cost estimate provided by Fedex web service for:
    ■ A user-specified origin zip code parameter.
    ■ A user-specified destination zip code parameter.
  ○ Minimum cost of:
    ■ Cost estimate provided by UPS web service for:
      ■ A user-specified origin zip code parameter.
      ■ A user-specified destination zip code parameter.
    ■ Cost estimate provided by DHL web service for:
      ■ A user-specified origin zip code parameter.
      ■ A user-specified destination zip code parameter.

16 alternatives:
0 (rank=187.0), DHL Fedex UPS USD...
1 (rank=187.0), DHL Fedex UPS USD...
2 (rank=187.0), DHL Fedex UPS USD...
3 (rank=188.0), DHL Fedex UPS USD...
4 (rank=188.0), DHL Fedex UPS USD...
5 (rank=188.0), DHL Fedex UPS USD...
6 (rank=188.0), DHL Fedex UPS USD...
7 (rank=189.0), DHL Fedex UPS USD...
8 (rank=191.0), Fedex UPS USD
9 (rank=191.0), DHL Fedex USD MinShippingCost
10 (rank=191.0), DHL UPS USD MinShippingCost
11 (rank=192.0), DHL UPS USD MinShippingCost
12 (rank=192.0), Fedex UPS USD MinShippingCost
13 (rank=196.0), DHL USD MinShippingCost
14 (rank=196.0), Fedex USD MinShippingCost
15 (rank=196.0), UPS USD MinShippingCost ← Alternate Plans ← Processing graph ← Text description of the processing graph User Parameters  ← Application specific user parameters
From Zip [07631]
To Zip   [10532]
[Apply]

```
<?aml version="1.0" encoding="UIF-8"?>
<process name="mario2">
<receiverGET name="receiver"/>
<receiverParam name="ToZip"/>
<input name="receiver" value="receiver"/>
<input name="key" value="ToZip"/>
</receiveParam>
<receive Param name="FromZip">
<input name="receiver" value="receiver"/>
<input name="key" value="FromZip"/>
</receiveParam>
```
← Preview of results Done                                    z s o □ Adblock

DHL Fedex

| JPY ShippingCost | Go |

JPY ShippingCost UPS

Zero Assemble Flow |Edit Flow| |Service URL| |View Source| |View Zero State|

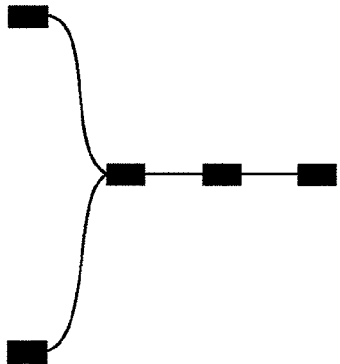

This flow has input parameters, and is outputting:

- USD to JPY conversion using rates from Yahoo Finance service of:
- Cost estimate provided by UPS web service for:
  o A user-specified origin zip code parameter.
  o A user-specified destination zip code parameter

User Parameters

From Zip  07631
To Zip    10532 apply 672.0319, UPS Ground

FIG. 7

ByEmailAddr DirectReports

| SametimeStatus | Go |

SametimeStatus ByName String

Zero Assemble Flow | Edit Flow | Service URL | View Source | View Zero State |

This flow has input parameters, and is outputting:
- REST service provided Sametime status of:
- Email address matched (using Bluepages) to:
- A user-specified Bluepages name query

User Parameters

Name Query | Riabov | apply

| riabov@us.ibm.com,32,I am Active- @Hawthorne, NY, US (Sametime 7.5.1) |

FIG. 8

METHOD AND SYSTEM FOR SIMPLIFIED SERVICE COMPOSITION IN WEB ENVIRONMENT

RELATED APPLICATIONS

This application is related to commonly assigned U.S. application Ser. No. 11/872,385, filed Oct. 15, 2007, the disclosure of which is incorporated by reference herein in its entirety.

BACKGROUND OF THE INVENTION

1. Technical Field

The present invention relates to service composition.

2. Discussion of the Related Art

Automatic service discovery and composition is one promise of Service Oriented Architecture (SOA) that is hard to achieve in practice. Currently, composition is done with graphical tools by manually selecting services and establishing their interactions. Business Process Execution Language (BPEL)-WS has been developed to describe composite services. However, describing composite services using BPEL-WS is tedious and requires extensive knowledge of the services being composed.

Automatic composition work has been focusing on composition using simple compatibility constraints, as well as semantic descriptions of services, such as Ontology Web Language (OWL)-S. The drawback of these approaches is that they do not provide an easy way of interacting with the composer/user. For example, even if the user is goal-oriented and does not require knowledge of services, the user must be familiar with the ontology that was used to describe the services. In addition, it is difficult for novice users to create goal specifications, since that involves studying the ontology to learn the terms the system uses. Further, the ontology does not automatically provide a method for verifying the requests. Hence, users do not have any guidance from the system that could help in specifying requests. This turns service composition into a tedious trial and error process.

With certain drawbacks of automatic service discovery and composition having been discussed, we will now introduce web services and follow that with a more detailed discussion of several approaches that may be used to compose the web services.

Web Services and Web Service Composition

According to the definition by World Wide Web Consortium (W3C), a web service is a software system designed to support interoperable machine-to-machine interaction over a network. Some definitions of web services appearing in the literature also require that the communications between machines is represented as eXtensible Markup Language (XML) messages following a Simple Object Access Protocol (SOAP) standard. Some definitions may also require that there is a machine-readable description of a service represented, for example, in Web Services Description Language (WSDL). Other specifications define protocols for publishing and discovering metadata about web services that enable applications to find them, either at design time or runtime, e.g., Universal Description Discovery and Integration (UDDI).

For purposes of this disclosure, we will use the most general definition that does not require SOAP, WSDL, or machine-readable descriptions of services. One example of web services that are not using SOAP and WSDL standards are REST (Representational State Transfer) web services, also referred to as RESTful web services in the literature. REST web services have become popular recently with the implementations made accessible to the public over the Internet, for example, by Amazon, Google and Yahoo. A description of the REST approach can be found, for example, in Leonard Richardson and Sam Ruby, "RESTful Web Services", O'Reilly Media, Inc. (May 8, 2007). This type of architecture has led to the emergence of the term Web-Oriented Architecture (WOA) used to emphasize their web oriented characteristics from the more generic term SOA.

Web services can be combined to provide a new composite service. The composite service can be made available as a service itself. One example of a software product that provides tools for web service composition is IBM™ WEBSPHERE™ Business Integration Server.

A number of web service flow languages have been developed to describe compositions of web services, including Business Process Execution Language for Web Services (BPEL4WS), Web Service Choreography Interface (WSCI), and others. The flow languages represent the flow of messages between web services, and can be used to describe composite services.

In addition to web services there are several other approaches to dealing with machine-to-machine interactions. More basic efforts include XML-RPC (Remote Procedure Call), a precursor to SOAP that was only capable of RPC, and various forms of HTTP usage without SOAP. More ambitious efforts like Common Object Request Broker Architecture (CORBA) and Distributed Component Object Module (DCOM) provide frameworks to enable distributed objects written in multiple languages running on multiple computers to interoperate.

Generalized Service Composition

A more general form of web service composition is what we refer to as generalized service composition. Generalized service composition allows composing services accessible via a network, such as web services, or via other over-the-network communication approaches, such as RPCs, together with program code executed locally on a computer where the composed service is deployed. In systems following this convention, a service is any computer code that can receive requests and optionally respond by returning results. For example, IBM™ Project Zero includes the Assemble Zero sub-component that provides a general flow language and execution runtime for generalized service composition.

Project Zero introduces a simple environment for creating, assembling and executing applications based on popular Web technologies. The Project Zero environment includes a scripting runtime for Groovy and PHP with application programming interfaces optimized for producing REST-style services, integration mash-ups and rich Web interfaces. Project Zero is an incubator project started within IBM™ that is focused on the agile development of the next generation of dynamic Web applications. At the core of Project Zero is a full-stack platform optimized for Web applications. The Project Zero platform is further extended with Project Zero sub-components specialized for specific web-application programming patterns.

The Project Zero Assemble sub-component provides the capability to access different services and assemble them into a Project Zero application. It can be used in a variety of different ways. For example: constructing a feed style application that processes and aggregates a set of feeds from different sources; constructing a conversational application that coordinates interactions with services; and allowing Project Zero applications to access services through a common application programming interface (API).

It is sometimes useful to associate functions such as transformation, routing and logging with existing services. The Assemble framework enables this type of functionality that it calls mediation.

The functionality for constructing applications that produce feeds or conversational applications is provided through the flow sub-component. This is an optimized and highly specialized flow engine for processing data feeds, and coordinating interactions with other services.

A Project Zero Assemble flow graph is formed as a selection of modules called activities, where each module may appear once, more than once, or not at all. Each module included in the flow graph can be individually configured. The modules forming the flow graph must be connected. The connections are established between producing and receiving endpoints of the same type respectively called outputs and inputs of the activities.

Project Zero provides a collection of built-in activities, which can be extended with user-defined activities. Built-in activities that are immediately available are listed below.

Action—is a generic activity for calling a static operation on a specified Java class. The inputs of the action form the parameters, the outputs are the result of the action.

GET—performs an HTTP GET. It has no input. Its output is the value of the response returned from the service.

POST—performs an HTTP POST. It has at most one input: the body of the post request. Its output is the value of the response returned from the service.

DELETE—performs an HTTP DELETE. It has no input or output.

ReceivePOST—a receive activity that consumes HTTP POST requests sent to the process that matches its optional URL fragment. The output of a receive activity is the value of the received message. It has no input.

ReplyPOST—a replyPOST is an activity that provides the response to an HTTP POST request previously matched to a receive activity. Its input is the value sent in the response. It has no output and at most one input. The value of the input is what will be sent in the response.

Receive-replyPOST—a receive-replyPOST activity is a combination of a receivePOST immediately followed by a replyPOST. Its output is the value of the received message. Its input is the same as for reply; the value sent in the response.

receiveGET, replyGET, and receive-replyGET—are similar to their POST counterparts, but for HTTP GET instead of HTTP POST.

While—a structured loop. The condition is evaluated when the loop is activated. If the condition is true, the activities inside the loop are activated (respecting the order specified by their links). Once all activities inside the loop have completed or disabled, the condition is evaluated again. This repeats until the condition evaluates to false, at which point navigation continues based on the links leaving the while activity itself. It has no input and no output variable.

Pick—a pick activity provides the ability for external choice. It contains a variable name and an ordered list of choices, each one corresponding to an external request. It has no input. Its output is a variable consisting of two parts: 1) either the name of the choice if one is present, or the numerical index of the choice; and 2) if the choice is based on an incoming message, then the incoming message's body is placed in the message part of the pick's output variable. If the choice itself also specifies a variable, then a copy is placed in that variable as well.

Assign—assignment allows initialization of variables and copying of values from one variable to another. As an assign can copy from and to multiple locations, it has no implicit input or output.

Empty—the empty activity implies no processing other than the navigation implied by its connection to other activities through links. It is provided to help create specific navigational patterns. The output of an empty activity is null. It has no input.

Automatic Composition

Similarly to how programs can be composed of operators and functions, composite services describe service invocations and other low-level constructs. Composite services are processing graphs composed of smaller service components. A service component can be an invocation of an existing service, an external data input (e.g., a user-specified parameter or data source), a data processing operator (e.g., an arithmetic operator), or an other (smaller) composite service specified as a processing graph of service components.

While many execution environments include tools that assist users in defining composite services, these tools typically require detailed definitions of the processing flow, including all service components and communication between the components. One example of this type of tool is IBM™ WEBSPHERE™ Studio.

In contrast, methods such as planning can be used to automatically compose new composite services based on a high level input provided by the user. Automatic composition methods require less knowledge about the service component and in general only require the user to specify the composition goal in application domain terms.

For purposes of automatic composition, in many scenarios the service components can be described in terms of their data effects and preconditions. In particular, we assume that a description (such as WSDL or JAVA™ object code with optional metadata annotations) of each service component specifies the input requirements of the service component (such as data type, semantics, access control labels, etc.). We refer to these input requirements as preconditions of service invocation, or simply preconditions. The description also specifies the effects of the service, describing the outputs of the service, including information such as data type, semantics, etc. In general, a component description may describe outputs as a function of inputs, so that the description of the output can only be fully determined once the specific inputs to the component have been determined. Note that in practical implementations the invocations can be synchronous, such as subroutine of RPCs, or asynchronous, such as asynchronous procedure calls or message exchange or message flow.

Under these assumptions, an automated planner can then be used to automatically assemble processing graphs based on a user-provided description of the desired output of the application. The descriptions of the components are provided to the planner in the form of a domain description. The planner can also take into account the specification of available primal inputs to the workflow, if not all inputs are available for a particular planning request.

The planner composes the workflow by connecting components, starting from the primal inputs. It evaluates possible combinations of components, by computing descriptions of component outputs, and comparing them to preconditions of components connected to the output. More than one component input can be connected to one component output or one primal input. Logically, this amounts to sending multiple copies of data produced by the component output, with one copy sent to each of the inputs. In practical implementation these do not have to be copies, and it is possible to pass data by reference instead of by value. The process terminates when an output of a component (or a set of outputs taken together) satisfy the conditions specified in the user goal requirement. Note that all conditions are evaluated at plan time, before any applications are deployed or executed.

If multiple alternative compositional applications can be constructed and shown to satisfy the same request, the planner may use heuristics and utility functions to rank the alternatives and select the highest ranked plans.

The application, once composed, is deployed in an execution environment and can be executed one or more times.

Examples of a planner and an execution environment are described in Zhen Liu, Anand Ranganathan and Anton Riabov, "A Planning Approach for Message-Oriented Semantic Web Service Composition", in AAAI-2007.

Similar work has been done in the contexts of Stream Processing and Grid Computing.

Faceted Search

Faceted search methods use tags to define the scope of user interaction with a system. However, faceted search is limited to searching over existing information represented, for example, as documents, web pages or feeds.

One notable example of a faceted search interface is FLAMENCO search. An overview of interfaces for managing faceted search is presented in Marti Hearst, Design Recommendations for Hierarchical Faceted Search Interfaces, ACM SIGIR Workshop on Faceted Search, August, 2006.

SUMMARY OF THE INVENTION

In an exemplary embodiment of the present invention, a method for service composition, comprises: receiving a tag query; composing a processing graph in accordance with the tag query, wherein the processing graph is composed by using annotated primal data and services and includes at least one of the services; and deploying the service in an execution environment.

The method further comprises displaying the processing graph.

Descriptions of the annotated primal data and services are represented as actions, with preconditions and effects of the actions corresponding to annotations on inputs and outputs of the annotated primal data and services, wherein composing the processing graph comprises: generating a description of the tag query, wherein the tag query is represented using predicates; invoking a planner to generate a plan for the actions that satisfy the tag query; and translating the plan into the processing graph.

The method further comprises: receiving a service call; and displaying output data produced by the service as a preview of results. After receiving the service call and prior to displaying the preview of results, the method further comprises: determining if an error resulted from deploying the service; wherein if there is an error, identifying the service as a failing component; recomposing the processing graph without using the failing component, the recomposed processing graph including another service; and deploying the another service in the execution environment.

After receiving the tag query, the method further comprises generating a tag cloud that includes tags that are only relevant to tags that were included in the tag query.

If a plurality of processing graphs are generated in response to the tag query, the method further comprises: ranking the plurality of processing graphs in order of quality; and displaying the ranked processing graphs.

The service is a web service. The web service is a Representational State Transfer (REST) web service.

In an exemplary embodiment of the present invention, a method for service composition, comprises: receiving a set of tags selected from a tag cloud, the set of tags corresponding to a goal; wherein after the set of tags is received: displaying the set of tags corresponding to the goal; generating a processing graph in accordance with the goal, the processing graph including a service; and generating a new tag cloud; wherein after the processing graph is generated: generating a preview of results of an output produced by the service; displaying implied and guessed tags; displaying a text description of the processing graph; and displaying the processing graph; wherein after the next tag cloud is generated: displaying the new tag cloud.

After the processing graph is generated, the method further comprises displaying a list of alternate processing graphs if more than one processing graph is generated. The method further comprises receiving a new processing graph selected from the list of alternative processing graphs and repeating the steps performed after the processing graph is generated.

The method further comprises displaying the preview of results. Prior to displaying the preview of results, the method further comprises: determining if an exception exists in the preview of results and generating a constraint to be applied to a newly generated processing graph; and generating a new processing graph in accordance with the constraint and repeating the steps performed after the processing graph is generated. The steps of determining if an exception exists and generating a new processing graph if there is an exception are executed automatically or a predetermined number of times.

The method further comprises: receiving a new set of tags selected from the new tag cloud, the new set of tags representing a new goal; and repeating the steps performed after the set of tags is received.

The preview of results is generated by: deploying the service in an execution environment; and invoking the service to retrieve a response, wherein the retrieved response is the output produced by the service.

The service is a web service. The web service is a REST web service.

In an exemplary embodiment of the present invention, a computer readable medium tangibly embodying a program of instructions executable by a processor to perform method steps for service composition, the method steps comprising: receiving a tag query; composing a processing graph in accordance with the tag query, wherein the processing graph is composed by using annotated primal data and services and includes at least one of the services; and deploying the service in an execution environment.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

BRIEF DESCRIPTION OF THE DRAWINGS

FIG. 2 shows elements of a user interface of the system according to an exemplary embodiment of the present invention;

FIG. 7 illustrates optimization according to an exemplary embodiment of the present invention;

FIG. 8 illustrates intelligent guessing according to an exemplary embodiment of the present invention.

DETAILED DESCRIPTION OF EXEMPLARY EMBODIMENTS

Presented herein is a system that combines and configures a number of unique components to provide an integrated set of tools that radically simplifies service composition. The system assembles new compositional applications automatically based on user-selected output properties. The system uses tag clouds to guide the user in this process, provides instantaneous feedback by showing a preview of the resulting output, and updates the tag cloud based on selected tags. The system is easy to use for end users of composed services who can create composite services for their needs without deep knowledge of the available services that are used as building blocks in composition.

The invention applies to composition of service oriented architecture (SOA) applications by instantiating, configuring and connecting processing components. The processing components consist of distributed services that analyze, transform, correlate, join and otherwise process data. The composition of connected and parameterized component instances is referred to as a processing graph. Once composed, the processing graph is presented to the user. The system can also present a preview of results generated by the application, request entry of parameters, and may deploy the processing graph in order to generate the preview of the results. The generated processing graph can get some of its input from external resources (independent SOA services) or user-specified parameters, and can itself become a resource for other SOA applications.

The main components/aspects of the invention are: 1) An efficient scalable planner used to compose services; 2) A modeling approach for describing components and specifies composition goals that allows the use of taxonomies and folksonomies; 3) A user interface based on context-dependent tag clouds, which provides guidance in goal refinement and makes goal specification easy and intuitive; 4) A generalized service orchestration runtime with support for exception handling (which may be replaced by BPEL runtime, Zero Assemble runtime, or others); 5) An exception handling module, which can invoke the planner and re-compose services if an exception happens during execution of a composed service; 6) Semantics-based tagging of resources; 7) Tag-based selection of resources; 8) Tag-based automatic composition of processing graphs; and 9) Seamless tagging and navigation across both existing and potentially composable resources.

Example target platforms can be any type of web service that receives and produces general message of structured and unstructured data such as those described in the Background section of this disclosure.

Figure 1:
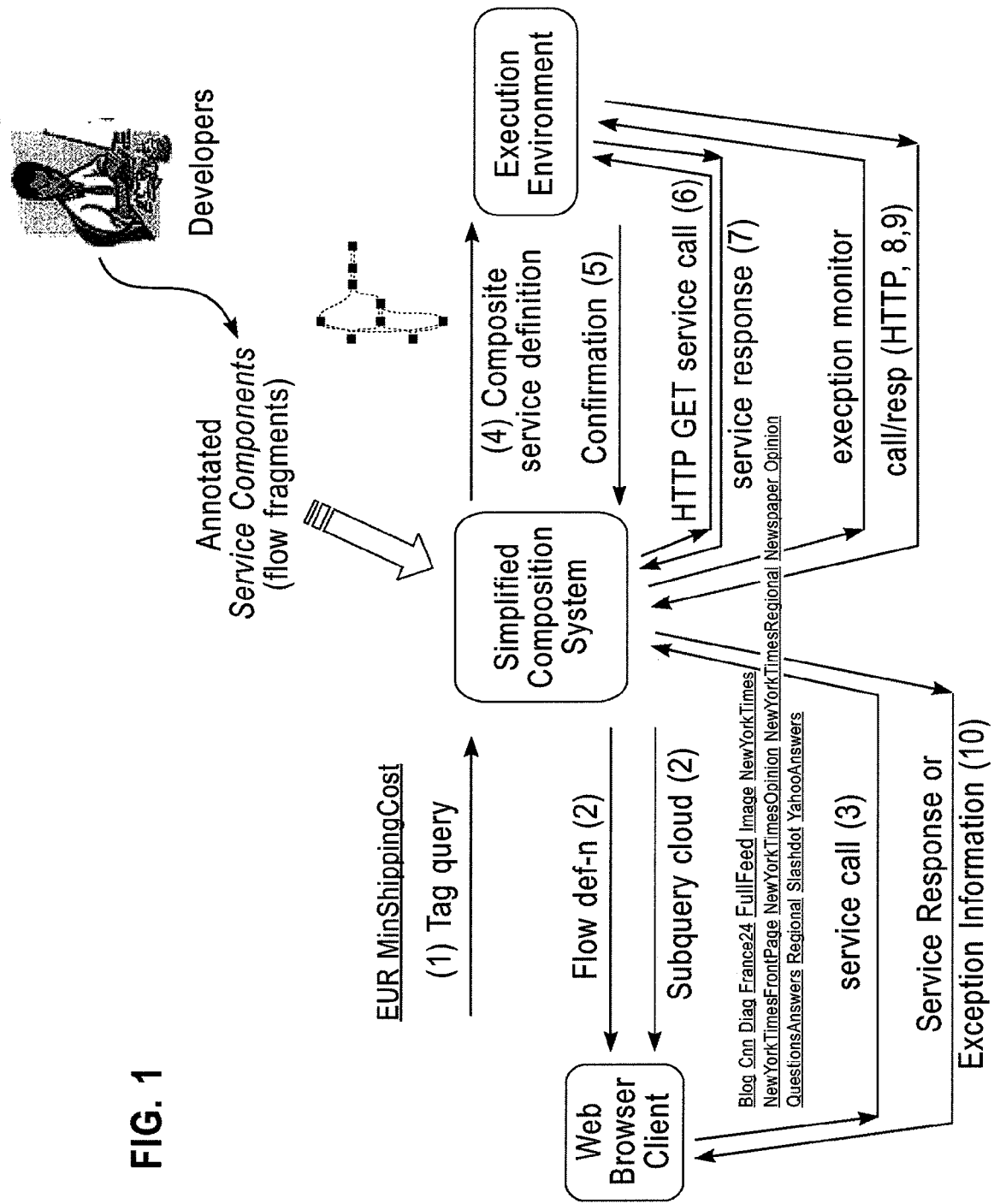
FIG. 1 shows an overview of a system according to an exemplary embodiment of the present invention.

FIG. 1 shows and overview of the system. As shown in FIG. 1, in response to a processing goal expressed as a tag query and received from a user (1) the system composes a processing graph (2), and upon a user request (3) or automatically, deploys the graph in a deployment environment (4,5), executes the services in a partial order described by the graph, and presents output data produced by the processing graph to the end user (6,7,10). To create the processing graph, the system uses annotated primal data and services provided by service component developers. An execution environment is, for example, a web-service execution environment based on BPEL, or Project Zero's Assemble. The system can monitor the execution of the processing graph in the execution environment (8,9) and report potential problems, such as failures (i.e., exceptions), to the user (10).

In FIG. 2, the elements of a user interface of the system are shown. These elements are explained below. Note that the contents of all elements of the interface are updated when new goals are specified by the user.

Tag cloud is a weighted list of tags. The weights, for example, reflect popularity of the tags, and the difference in weights is represented by different tag sizes. Clicking on any tag in the tag cloud adds the tag to the planning goal, and to the list of selected tags. This also leads to a new processing graph being composed, and a new tag cloud being shown. Alternatively the user can enter tags directly in a search string. The new tag cloud is created in the context of currently selected tags. In particular, it does not include the selected tags or any other tags that never appear with the selected tags. When the new processing graph is constructed, it is immediately deployed and the resulting data is shown in a preview window.

Implied tags are tags that always appear together with the selected tags. Guessed tags are tags assigned to the output of the graph, and such they do not appear in implied or selected tags. A user can unselect a tag by either clicking on a selected tag or a guessed tag. Implied tags are determined automatically from the selected and guessed tags, and thus cannot be individually unselected.

Processing graph element is a depiction of the processing graph in graphical form. Text description of the processing graph is created based on the set of services included in the processing graph. In one embodiment, hovering a mouse over services in a graphical representation of the processing graph on the left causes a highlight to appear on the corresponding line of the textual description on the right.

Disposition frame contains a list of commands for further operations on the deployed processing graph. In particular, an "Edit" command opens an editor window, where the graph can be modified after automatic composition. The editor can be provided by the target execution environment.

Very often a tag selection can correspond to several processing graphs. The invention uses a utility function to rank the processing graphs, and select by default the highest ranked processing graph. Alternate plans element is a list of the alternate processing graphs with their ranking values. In order to try a different processing graph the user can click on the processing graph in the list.

Preview (or full view) of results produced by the composed and deployed processing graph is shown in the bottom of the window.

The user interface may also include a search string, where tag clouds can be type in, as an alternative to clicking tags in the tag cloud.

We will now describe the invention in detail. The description is written in terms of web service components. This does not prevent the system from being used in the context of any SOA with any similar information processing applications.

User Interface and System Operation

Users interact with the system by specifying processing goals as a set of tags via the user interface shown in FIG. 2. The system responds by generating a processing graph that outputs information that satisfies this goal. The system also updates the user interface elements.

Figure 3:
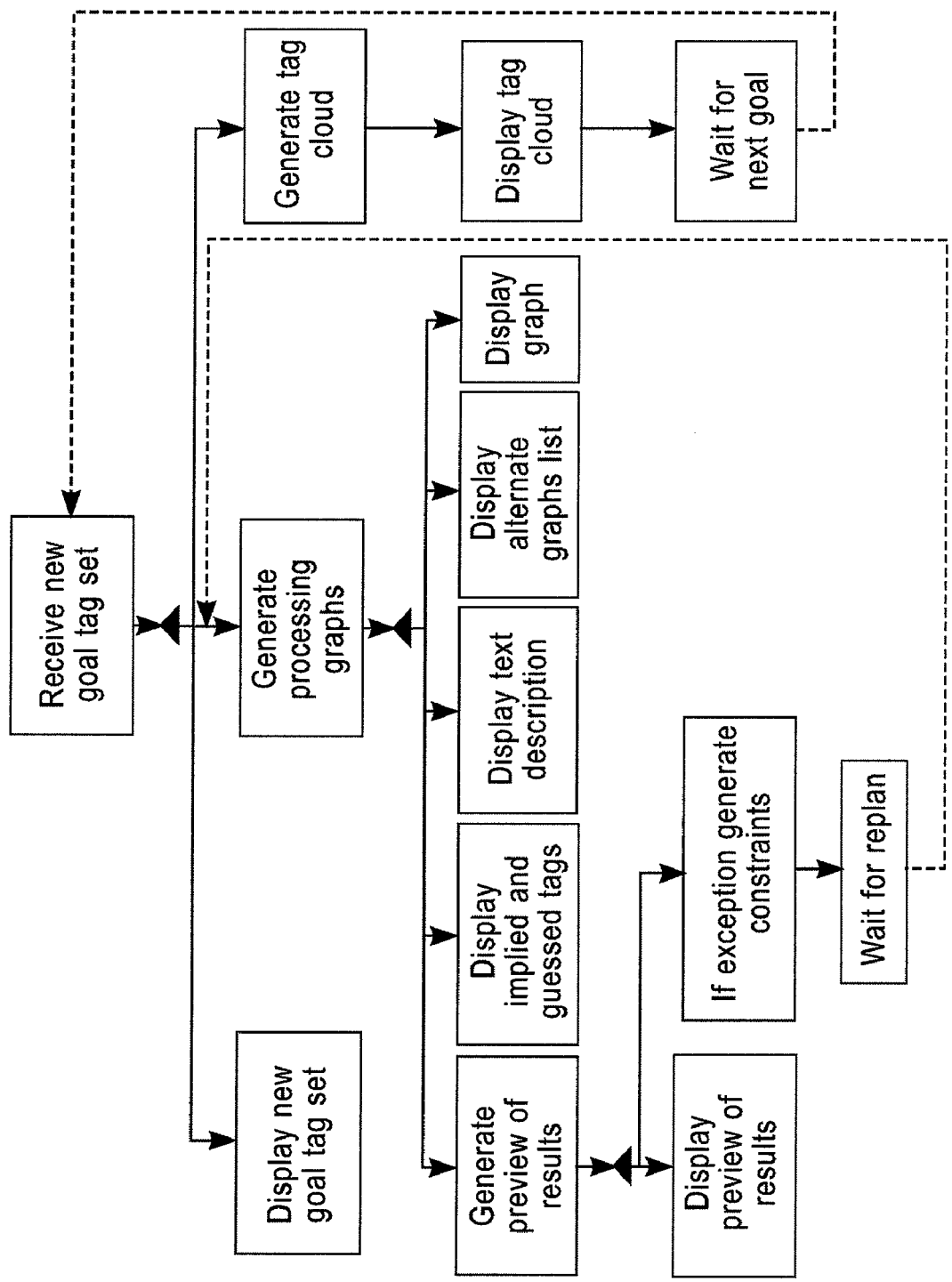
FIG. 3 shows operations that the system performs when a user specifies a new goal tag set according to an exemplary embodiment of the present invention.

FIG. 3 shows the operations that the system performs when a user specifies a new goal. First, it receives a new goal tag set from the user. This can be a result of the user clicking a tag in the tag cloud, entering a set of tags directly, or specifying the set of tags using other means.

Once the new goal tag set is obtained, the system can in parallel display the new selection of tags corresponding to the goal (i.e., simply echoing user input), generate a processing graph that produces an output with annotation containing all goal tags, and generate the next tag cloud. The next tag cloud, for example, can be pre-computed for each goal specification. If that implementation is chosen, the pre-computed tag cloud is retrieved and displayed. Tag clouds can also be computed dynamically for each new goal.

Once the tag cloud is generated and shown, the user can click tags in the tag cloud to modify the current goal (by adding the clicked tag). The user can also click on selected or guessed tags already included in the goal, and thus remove the tags from the goal. Both of these operations change the goal, and restart the user interface update procedure in FIG. 3 from the beginning.

Once the processing graph has been generated, the system can, in parallel or in any order, perform the following operations: generate a preview of results, display implied and guessed tags corresponding to the processing graph, and display a graphical and text description of the processing graph. In addition, if there is more than one processing graph that satisfies the tag selection, the system can produce a list of alternate graphs with their respective ranking.

Once the preview of results is generated, it is also shown. For example, one method of generating a preview of results is to deploy the generated processing graph as a composed web service in the corresponding execution environment, to invoke it (which triggers execution of the composed service), and display a returned response from the deployed processing graph as the preview of results produced by this graph.

In certain runtime environments, if an error is detected during execution of the composed service, an exception is raised with an identification of the failing component. This information about the failing component can then be introduced as a constraint and applied to the processing graph generation process in order to generate a new graph that does not use the failing components. The backup processing graph generation can be executed automatically (for example, up to a given maximum number of times) or on a per-user request.

Tagging of External Resources and SOA Results

Internally, the system uses Stream Processing Planning Language (SPPL) described in A. Riabov, Z. Liu. Planning for Stream Processing Systems. In Proceedings of AAAI-05, the disclosure of which is incorporated by reference herein in its entirety, for representing the descriptions of services. In SPPL, each resource is described by predicates (e.g., predicates corresponding to keywords or tags). In addition, there are rules for computing descriptions of intermediate results from external resources by applying services on them. Hence, the system can match goals specified as tags to resources, by determining a match if the goal specified as a set of tags is a subset of the tags in the description of a resource. We can also create tag clouds using tag popularity over the descriptions of both the existing and not yet existing, but potentially composable, resources.

Figure 4:
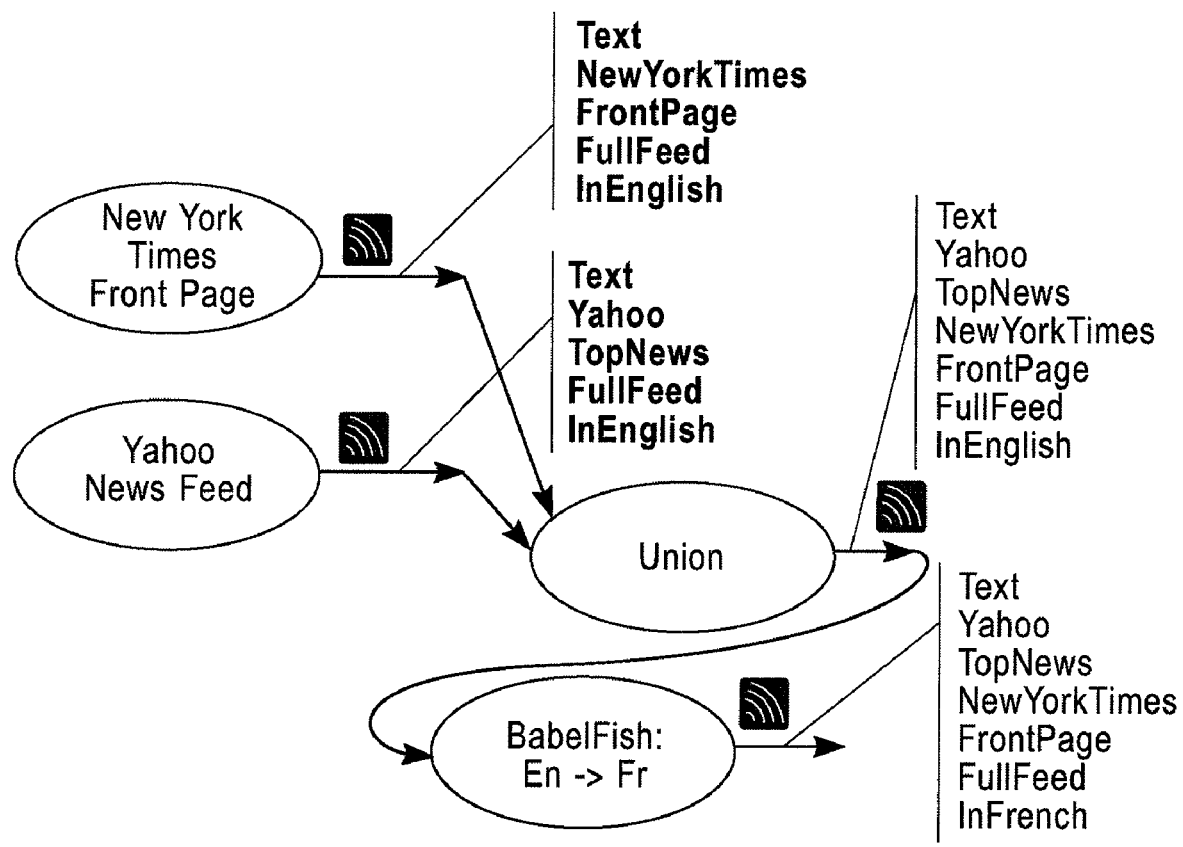
FIG. 4 illustrates annotation of component outputs with tags according to an exemplary embodiment of the present invention.

FIG. 4 illustrates the annotation of component outputs with tags. It is assumed that primal sources (external resources which are not results of an application composed by the invention) are annotated manually. Manually created annotations are shown in bold font. The system uses descriptions of components and annotations specified on resources to compute annotations on outputs of the components applied to resources. This computation can be applied recursively. Descriptions of components specify for each component the rules for computing the set of tags described by the output given descriptions of inputs. For example, these rules can specify which tags are carried from input to output, which ones are not carried, and which tags are added to output independently of their presence in the input. SPPL provides one way of specifying these rules by describing the components as SPPL actions, and specifying the preconditions and the effects of the actions.

In one embodiment, tag clouds are generated by computing a weight value for each tag in the context of the currently selected goal. This is accomplished by analyzing the descriptions of all existing resources and potentially generated outputs that can be matched to the current goal (or descriptions of all existing resources, if there is currently no goal specified). The weight of a tag in this case is taken to be equal to the number of such descriptions that contain the tag.

Composing Services for Specified Goals

In one embodiment, goals are represented using SPPL predicates, and descriptions of service components and external resources are represented as SPPL actions, with preconditions and effects corresponding to annotations on inputs and outputs of these actions. The task of generating the processing graph is then accomplished by invoking an SPPL planner to generate a highest quality plan for the specified set of actions and the goal. The plan produced by the SPPL planner can then be translated trivially into a processing graph, by mapping action instances included in the plan to instances of corresponding components in the processing graph, and establishing connections between component instances accordingly. It is also possible that the SPPL planner does not find any plans satisfying the goal. In this case the planner reports an error condition, which is reflected in the user interface, and the processing graph is not generated.

To represent descriptions of service components and resources in SPPL, an SPPL domain description must be created. The file containing the SPPL domain description is part of the system configuration, and is not changed when new user-defined goals are processed. For example, consider the following SPPL planning domain description:

```
(define (domain Example)
  (:types
    __Format
    (Price - __Format)
    (ShippingCost - Price)
    __Currency
    (USD - __Currency)
    (EUR - __Currency)
    __Source
    (UPS - __Source)
    __DataType
    (__ZipCode - __DataType)
    (__FromZipCode - __ZipCode)
    (__ToZipCode - __ZipCode)
  )
```

-continued

```
(:predicates :clearlogic
    (hasFormat ?x - __Format)
    (hasCurrency ?x - __Currency)
    (hasType ?x - __DataType)
)
(:predicates :orlogic
    (hasSource ?x - __Source)
)
(:constants
    (USD - USD)
    (UPS - UPS)
    (EUR - EUR)
    (ShippingCost - ShippingCost)
    (__FromZipCode - __FromZipCode)
    (__ToZipCode - __ToZipCode)
)
(:action ups
    :parameters(?fromZip - __FromZipCode ?toZip - __ToZipCode)
    :cost(20 1)
    :precondition[in1] ( and (hasType ?fromZip))
    :precondition[in3] ( and (hasType ?toZip))
    :effect[id0] ( and (hasCurrency USD)
            (hasFormat ShippingCost)
            (hasSource UPS) )
)
(:action InputFromZip
    :cost(-100 1)
    :effect[out] (and
        (hasType __FromZipCode)
        )
)
(:action InputToZip
    :cost(-100 1)
    :effect[out] (and (hasType __ToZipCode) )
)
(:action quoteUSDEUR
    :parameters(?price - Price)
    :cost(-20 1)
    :precondition[in1] (and (hasFormat ?price) (hasCurrency USD))
    :effect[id0] (and (hasFormat ?price) (hasCurrency EUR))
)
```

This domain description defines several types that correspond to tags, such as 'USD', 'Price', typed constants of several of the types, four predicates, "hasFormat", 'hasCurrency', 'hasType' and 'hasSource' and four actions, 'ups', 'quoteUSDEUR', 'InputToZip' and 'InputFromZip'. The actions describe, correspondingly, a service component requesting a shipping price quote from UPS shipping service, a service component converting a price US dollars to an equivalent in Euro and two input parameters of type zip code. The cost vectors of actions specified in the ':cost' statements are used to compute a multi-dimensional cost value of the plan, which is computed according to SPPL rules, i.e., by component-wise addition of cost vectors. The effect of each action describes the semantics using a formula expressed with predicates, variables and constants. Action 'quoteUSDEUR' has a parameter ?price of type Price, which is used in the expressions defining the precondition and the effect. According to SPPL rules this indicates that the output of the component is related to the same format (hasFormat ?price) predicate as its input, which expresses that the currency translation operator does not affect the format of the data. SPPL requires that in valid plans all action parameters are bound to specific values and that all preconditions are satisfied with the descriptions of connected streams. Port names, e.g., [in1], are used to assign conditions to specific input and output ports and avoid ambiguity for components that have more than one input or more than one output.

The SPPL description of the goal is generated for the user-specified goal (i.e., set of tags) by matching tags specified in the goal to type names and including into the SPPL goal expression all predicates that have parameters of corresponding type or a super-type of the corresponding type. For example, for a goal specified as 'ShippingCost EUR' the generated SPPL goal description will be:

```
(define (problem ExampleGoal)
(:domain Example)
(:goal
    :parameters(?x - ShippingCost ?y - EUR)
    :precondition
    (and
        (hasFormat ?x)
        (hasCurrency ?y)
    ))
(:objective -1 0)
(:bound 1000000 40)
)
```

Here we have extended the traditional SPPL with a parametric goal—in original SPPL the goals do not have parameters and must be specified as ground formulas. The parametric goal is interpreted similarly to a parametric action without effects, i.e., the goal is considered satisfied when the precondition is satisfied with at least one assignment of parameter values. The output of the SPPL planner is a plan. In the example described above the SPPL planner output is:

```
<planset>
  <grid>
    <dim number="0">
      <value>-1e+010</value>
      <value>-9.999e+009</value>
    </dim>
    <dim number="1">
      <value>0</value>
      <value>40</value>
    </dim>
  </grid>
  <plangraph
    problem="ExampleGoal"
    objective="200"
    cost="-200,4"
  >
    <node id="0" name="InputFromZip">
      <port name="out">
        <a name="hasType"><p>__FromZipCode</p></a>
      </port>
    </node>
    <node id="1" name="InputToZip">
      <port name="out">
        <a name="hasType"><p>__ToZipCode</p></a>
      </port>
    </node>
    <node id="2" name="ups"><p>__FromZipCode</p><p>__ToZipCode</p>
      <port name="id0">
        <a name="hasSource"><p>UPS</p></a>
        <a name="hasCurrency"><p>USD</p></a>
        <a name="hasFormat"><p>ShippingCost</p></a>
      </port>
    </node>
    <node id="3" name="quoteUSDEUR"><p>ShippingCost</p>
      <port name="id0">
        <a name="hasSource"><p>UPS</p></a>
        <a name="hasCurrency"><p>EUR</p></a>
        <a name="hasFormat"><p>Shippingcost</p></a>
      </port>
    </node>
    <node id="4" name="-Goal_0">
      <p>ShippingCost</p><p>EUR</p>
      <port name="g0">
        <a name="hasSource"><p>UPS</p></a>
        <a name="hasCurrency"><p>EUR</p></a>
```

-continued

```
    <a name="hasFormat"><p>ShippingCost</p></a>
      </port>
    </node>
    <link fromNode="1" fromPort="out" toNode="2"
toPort="in3"/>
    <link fromNode="0" fromPort="out" toNode="2"
toPort="in1"/>
    <link fromNode="2" fromPort="id0" toNode="3"
toPort="in1"/>
    <link fromNode="3" fromPort="id0" toNode="4"
toPort="Port1"/>
    <link fromNode="4" fromPort="g0" toNode="-2"
toPort="_goal"/>
  </plangraph>
</planset>
```

The planner output describes a processing graph that consists of an instance of each of the actions, with the zip code inputs connected to the two input ports of the 'ups' action, with the single output of 'ups' connected to the single input of 'quoteUSDEUR', and with the single output of that action connected to the goal, i.e., the final output of the plan.

This processing graph description is subsequently translated into a composite service description recognized by the execution environment, and can be deployed for execution.

Navigation Using Tag Clouds

Tag clouds are weighted lists of keywords (tags). One way to present a tag cloud visually is to display tags with higher weights in larger fonts. This method of showing a tag cloud has become the de-facto standard way of presenting weighted lists of tags on the Internet, and is used by a large number of web sites, including flickr.com, del.icio.us, and others. Traditionally, tag clouds are used to select content that is relevant to exactly one selected tag (for example, Flickr, technorti, del.icio.us, etc.). In our system, users can select a subset of tags for a more precise description of the goal. For each new selection of tags, a new tag cloud is generated reflecting tag popularity only among the sources that are relevant to all tags already selected.

Figure 5:
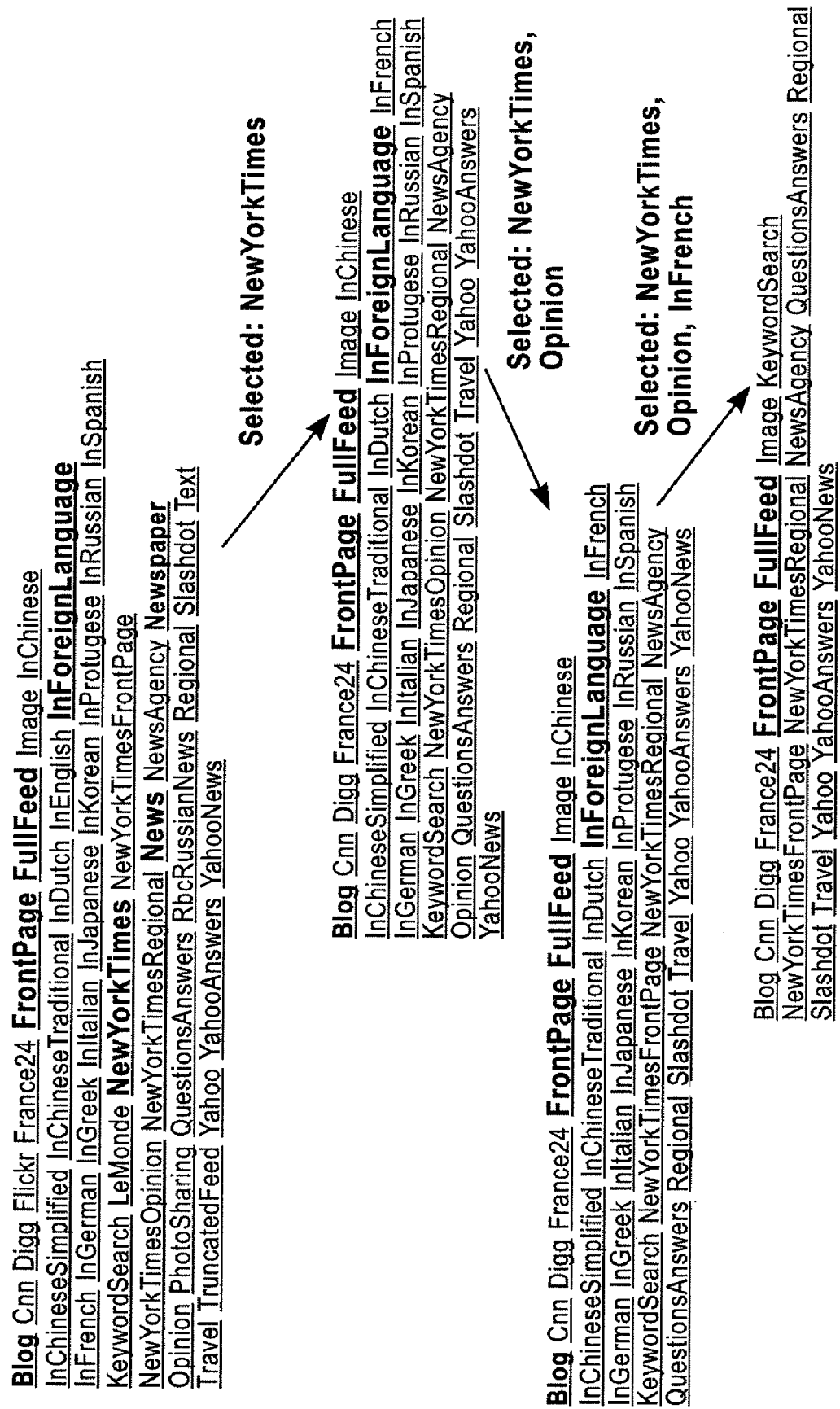
FIG. 5 illustrates navigation using tag clouds according to an exemplary embodiment of the present invention.

In our system each tag in the tag cloud is a hyperlink, clicking on which results in a transition to the screen where this tag is added to the set of selected tags. Other elements of the screen are updated accordingly with the selection. In particular, as described in this subsection, the tag cloud is replaced by a refined tag cloud that contains only the tags that can be combined with the current set of selected tags. As shown in FIG. 5, the more tags are added to the set of selected tags, the smaller the choice of other tags that can be added.

Semantically Extended Tagging

Semantic information can be used to extend tagging of streams automatically, given a short description provided by users. For example, OWL ontologies can be used, possibly complemented by DL-reasoning or other types of reasoning, to extend the set of tags provided by the user by other related terms specified in the ontology. This can be achieved by specifying a mapping between the tags and onotology artifacts, such as URIs, and automatically adding tags mapped to URIs that are related to URIs mapped to user-provided tags.

Figure 6:
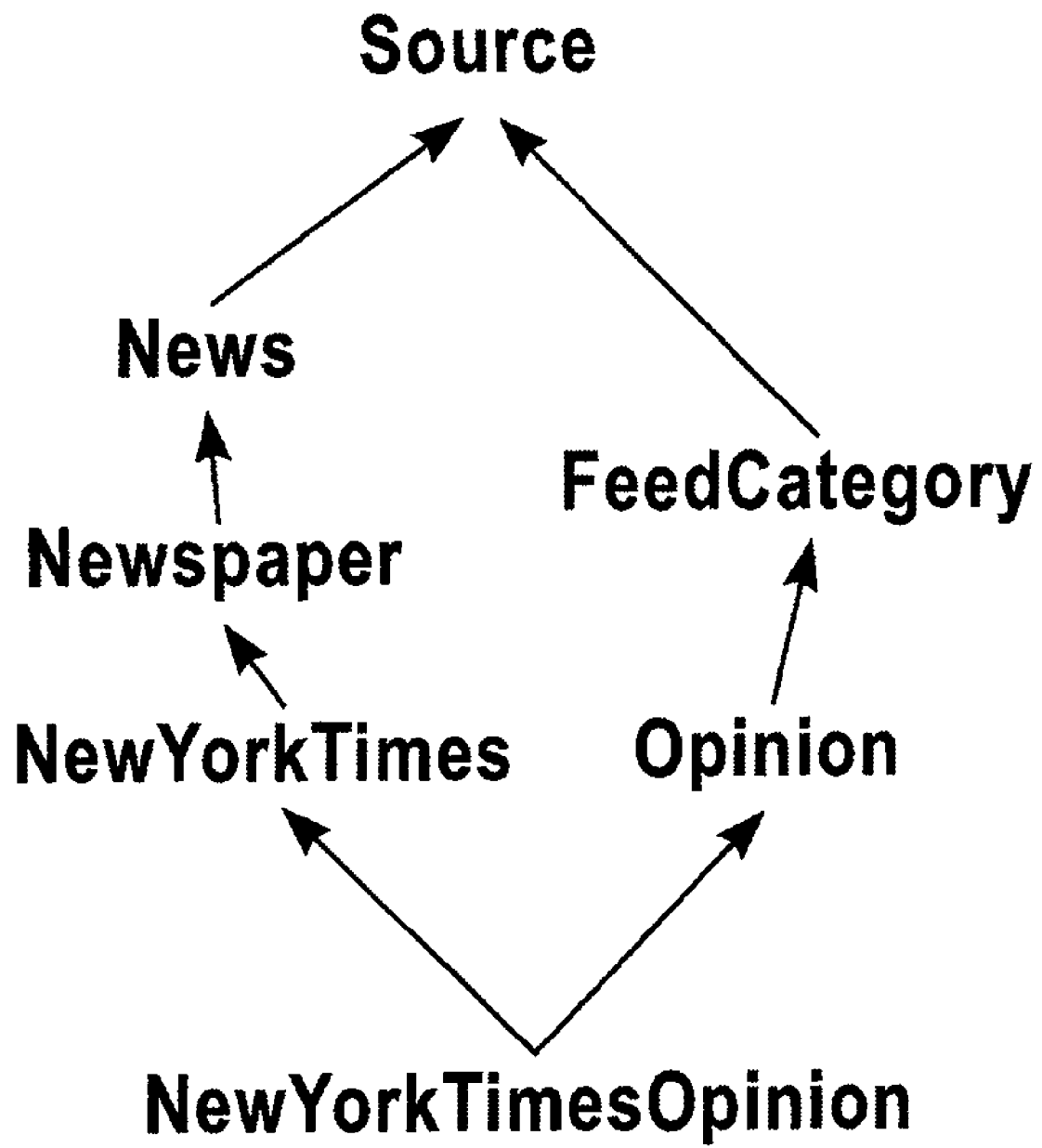
FIG. 6 illustrates a taxonomy fragment according to an exemplary embodiment of the present invention.

In one embodiment, tags can be organized in a taxonomy with multiple inheritance. The taxonomy can be specified in OWL-DL, RDFS or in other representations. When a resource is annotated with a tag, all ancestor tags are automatically added to the resource. For example (see FIG. 6), adding NewYorkTimesOpinion tag automatically adds Opinion, NewYorkTimes, Newspaper and News to the same annotation for the purposes of computing tag clouds and matching resources to goals. Therefore, a resource annotated with "NewYorkTimesOpinion" will be a match to a goal "Newspaper". In this implementation, SPPL typestream is used to represent and reason about taxonomies in an efficient manner.

Composing Parametric Processing Graphs

In some deployment environments, deployed processing graphs can be configured as web services that can receive user-defined parameters and use them in processing the data. Our system can compose parametric processing graphs (see FIG. 7). One difficulty is in identifying when two parametric services should use the same parameter value. In our system we use a classification of parameters to address this: parameters of the same type can be matched to the same value, and different type parameters require separate values, such as FromZipCode and ToZipCode in the above SPPL planning domain description, which both require a ZIP code as a value. Our system can also "hardcode", i.e., embed, values of configuration parameters into processing graphs, for example, when they are resource specific to the parameter value.

Optimization

Our system finds optimal solutions for satisfying goals by evaluating possible quality/resource tradeoffs. For example (see FIG. 7), possible alternative processing graphs for achieving the goal expressed by the set of tags {JPY, ShippingCost} include computing the shipping cost, converting it in different currencies, and obtaining the requested result in JPY. The system performs optimization according to SPPL rules, which allow optimization to be performed on multiple dimensions by specifying a utility function. The alternative plans are ranked according to the utility function. In the example shown in FIG. 7, the utility function is such that processing graphs with a smaller number of translation service instances are preferred to graphs that have larger numbers of such services. This is achieved by adding a penalty to the optimization objective for each translation service. As a result of the optimization, direct translation from USD currency to JPY currency, which requires only one translation service, is preferred to indirect translations that require two or more translations such as USD to EUR to JPY.

Intelligent Guessing

Selected tags may not provide enough information. Our system uses quality estimates (same as for selecting optimal processing graphs) to make a best guess of what the intentions of the user were. This is achieved by ranking all processing graphs satisfying all goal constraints, and the highest ranking processing graph is selected and processed. In the example shown in FIG. 8, the goal is specified as "SametimeStatus" indicating the user requested status information. There are multiple possible interpretations of this general goal. The tags shown next "SametimeStatus" in the interface, i.e., tags "ByName" and "String", indicate other tags describing the output of the composed processing graph. Showing these tags as part of the feedback from the system helps users understand how the system has interpreted the request. Based on this information, the user may decide to change the goal, for example, by adding "ByEmailAddr", if the user prefers status information presented based on email address, and not based on name, as the system suggested.

Implementation

In one embodiment, the system can be implemented as a web application written in JAVA™ language. Users interact with the system by using a browser that displays the user interface elements described above, and implements the process described above. The web application keeps track of users, their sessions and currently processed requests. The web application interacts with the operating environments to deploy processing flows on behalf of the users.

In response to a query received from the user and specified as a set of tags (i.e., keywords), the system composes a service (processing graph) that corresponds to the query, deploys the service in the deployment environment and (optionally) makes a request to that service, and presents output data produced by the service to the end user as a preview of results. To create the processing graph the system uses an annotated set of services.

The system can connect to and deploy composed services in a variety of execution environments, for example, in a web service orchestration server supporting a WS-BPEL standard, such as IBM™ WEBSPHERE™ Business Integration Server, or in Project Zero Assemble runtime. A special case is when the deployment environment is a JAVA™-based parallel execution environment, which provides the ability to run services implemented either as JAVA™ code or web services.

If the environment is capable of detecting error conditions in service execution, and passing the error condition to a replanning module of our system, the replanning module will generate a new service for the same request submitted by the user, avoiding invocation of the failed service and using alternate methods for satisfying the user's request. Replanning can be triggered on user request or automatically on service invocation.

Figure 9:
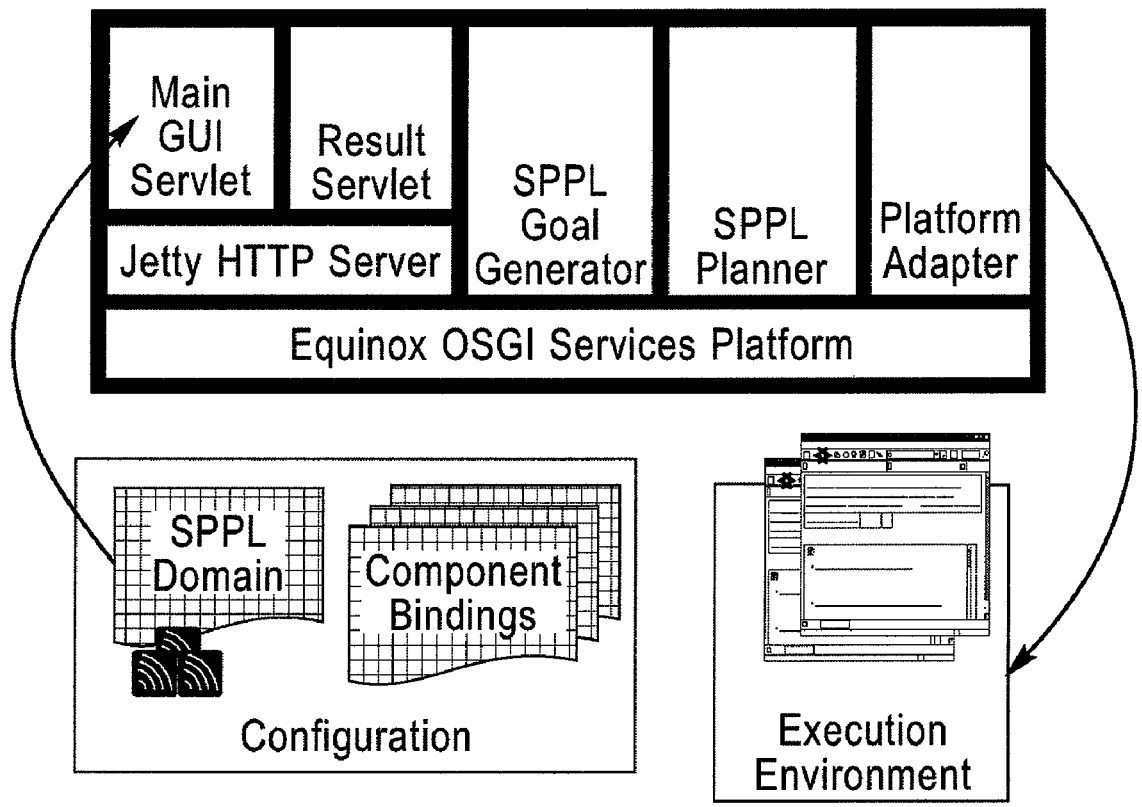
FIG. 9 illustrates an architecture of a system according to an exemplary embodiment of the present invention.

FIG. 9 shows an example architecture of the system. The system consists of several modules implemented as OSGi services deployed on an Eclipse Equinox implementation of an OSGi platform. The GUI is implemented by two servlets, the Main GUI Servlet that generates the screen shown in FIG. 2 and the Results Servlet that generates the "preview of results" screen element shown in FIG. 2.

Jetty web server, integrated with OSGI platform, is used to host the servlets. SPPL Goal Generator service generates SPPL goal descriptions based on a user-specified set of tags submitted via the Main GUI Servlet.

SPPL Planner service invokes an SPPL planner to process the generated goal and generate a processing graph. Examples of a planner and an execution environment are described in Zhen Liu, Anand Ranganathan and Anton Riabov, "A Planning Approach for Message-Oriented Semantic Web Service Composition", in AAAI-2007, the disclosure of which is incorporated by reference herein in its entirety.

The Platform Adapter service translates the processing graph produced by the SPPL planner to the format recognized by the target execution environment. The Platform Adapter service can also include procedures for deploying the translated processing graph in the target execution environment, for invoking the deployed processing graph and retrieving results of its execution, and for generating a preview of results received from the processing graph.

The system is configured by providing an SPPL domain description that includes descriptions of all service components and primal data, and optionally a set of component bindings. The component bindings are files used by the platform adapter to generate a platform-specific representation of the processing graph. The component bindings are typically represented as templates, with one template provided for each component, with placeholders that are filled in by the platform adapter to represent connections between components in generated processing graphs.

It is understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is also understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It is further understood that the above description is only representative of illustrative embodiments. For convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for service composition, comprising:
receiving a tag query;
composing, using a processor of a computer, a processing graph in accordance with the tag query, wherein the processing graph is composed by using machine code executable by the computer to process annotated primal data and services, a service is a software system designed to support interoperable machine-to-machine interaction over a network, and the processing graph includes first and second services connected to each other to produce an output identified by the tag query; and
deploying the first and second services in an execution environment and conveying a result of deploying the first and second services to a user;
wherein composing the processing graph comprises:
generating a description of the tag query, wherein the tag query is represented using predicates;
invoking a planner to generate a plan for the actions that satisfy the tag query; and
translating the plan into the processing graph.

2. The method of claim 1, further comprising:
displaying the processing graph.

3. The method of claim 1, wherein descriptions of the annotated primal data and services are represented as actions, with preconditions and effects of the actions corresponding to annotations on inputs and outputs of the annotated primal data and services.

4. The method of claim 1, further comprising:
receiving a service call; and
displaying output data produced by the first and second services as a preview of results.

5. The method of claim 4, wherein after receiving the service call and prior to displaying the preview of results, the method further comprises:
  determining if an error resulted from deploying the first and second services;
  wherein if there is an error,
    identifying at least one of the first and second services as a failing component;
    recomposing the processing graph without using the failing component, the recomposed processing graph including another service; and
    deploying the another service in the execution environment.

6. The method of claim 1, wherein after receiving the tag query, the method further comprises:
  generating a tag cloud that includes tags that are only relevant to tags that were included in the tag query.

7. The method of claim 1, wherein if a plurality of processing graphs are generated in response to the tag query, the method further comprises:
  ranking the plurality of processing graphs in order of quality; and
  displaying the ranked processing graphs.

8. The method of claim 1, wherein the service is a web service.

9. The method of claim 8, wherein the web service is a Representational State Transfer (REST) web service.

10. A method for service composition, comprising:
  receiving a set of tags selected from a tag cloud, the set of tags corresponding to a goal;
  wherein after the set of tags is received:
    displaying the set of tags corresponding to the goal;
    generating a processing graph in accordance with the goal, the processing graph including first and second services connected to each other to produce an output corresponding to the goal, a service being a software system designed to support interoperable machine-to-machine interaction over a network; and
    generating a new tag cloud;
  wherein after the processing graph is generated:
    generating a preview of results of the output produced by the first and second services and conveying these results to a user;
    displaying implied and guessed tags;
    displaying a text description of the processing graph; and
    displaying the processing graph;
  wherein after the new tag cloud is generated:
    displaying the new tag cloud;
    displaying the preview of results;
  wherein prior to displaying the preview of results:
    determining if an exception exists in the preview of results and generating a constraint to be applied to a newly generated processing graph; and
    generating a new processing graph in accordance with the constraint and repeating the steps performed after the processing graph is generated;
  the steps of determining if an exception exists and generating a new processing graph if there is an exception are executed automatically or a predetermined number of times.

11. The method of claim 10, wherein after the processing graph is generated, the method further comprises:
  displaying a list of alternate processing graphs if more than one processing graph is generated.

12. The method of claim 11, further comprising:
  receiving a new processing graph selected from the list of alternative processing graphs and repeating the steps performed after the processing graph is generated.

13. The method of claim 10, further comprising:
  receiving a new set of tags selected from the new tag cloud, the new set of tags representing a new goal; and
  repeating the steps performed after the set of tags is received.

14. The method of claim 10, wherein the preview of results is generated by:
  deploying the first and second services in an execution environment; and
  invoking the first and second services to retrieve a response, wherein the retrieved response is the output produced by the first and second services.

15. The method of claim 10, wherein at least one of the first and second services is a web service.

16. The method of claim 15, wherein the web service is a Representational State Transfer (REST) web service.

17. A computer readable medium tangibly embodying a program of instructions executable by a processor to perform method steps for service composition, the method steps comprising:
  receiving a tag query;
  composing, using a processor of a computer, a processing graph in accordance with the tag query, wherein the processing graph is composed by using machine code executable by the computer to process annotated primal data and services, a service is a software system designed to support interoperable machine-to-machine interaction over a network, and the processing graph includes first and second services connected to each other to produce an output identified by the tag query; and
  deploying the first and second services in an execution environment and conveying a result of deploying the first and second services to a user;
  wherein composing the processing graph comprises:
  generating a description of the tag query, wherein the tag query is represented using predicates;
  invoking a planner to generate a plan for the actions that satisfy the tag query;
  and translating the plan into the processing graph.

\* \* \* \* \*